United States Patent [19]

Donovan

[11] 4,310,162
[45] Jan. 12, 1982

[54] HIGH PRESSURE LIP SEAL

[75] Inventor: William F. Donovan, Aberdeen, Md.

[73] Assignee: The United States of America as represented by the Secretary of the Army, Washington, D.C.

[21] Appl. No.: 122,631

[22] Filed: Feb. 19, 1980

[51] Int. Cl.³ .................... F01B 19/00; B65D 53/04
[52] U.S. Cl. .................................. 277/103; 277/117; 220/3
[58] Field of Search ............... 277/103, 117, 30, 102, 277/104, 116.4, 116.8, 118, 144; 73/190 R, 191, 192; 220/203, 208, 240, 81 R, 3

[56] References Cited

U.S. PATENT DOCUMENTS

| | | | |
|---|---|---|---|
| 2,008,321 | 7/1935 | Cornish | 220/3 X |
| 2,065,870 | 12/1936 | Parr | 73/191 |
| 2,252,488 | 8/1941 | Bierend | 220/3 X |
| 3,220,594 | 11/1965 | Ortheil et al. | 220/81 R |
| 3,537,357 | 11/1970 | Packer | 277/117 X |
| 4,239,124 | 12/1980 | Inouye | 220/240 |

Primary Examiner—Steven M. Pollard
Attorney, Agent, or Firm—Nathan Edelberg; Robert P. Gibson; A. Victor Erkkila

[57] ABSTRACT

A pressure seal for sealing a vessel against passage of fluid from a high pressure containing cavity is disclosed to include a barrier means slidably disposed within the cavity having a seal body and a seal piston reciprocably received within the seal body. The seal piston and seal body cooperate to define a fluid containing chamber for accommodating compressible fluid to assist in the control of forces for generating sealing. The seal means include a primary seal for relatively low pressures and a metal-to-metal seal wherein the outer surface of at least a portion of the seal body is deflected outwardly against the inner surface of the cavity by displacement of the seal piston inwardly of the seal body such as to initially provide a secondary seal against passage of fluid outwardly of the cavity and thereafter providing sealing which increases in intensity in response to continuous build-up of pressure within the cavity.

3 Claims, 4 Drawing Figures

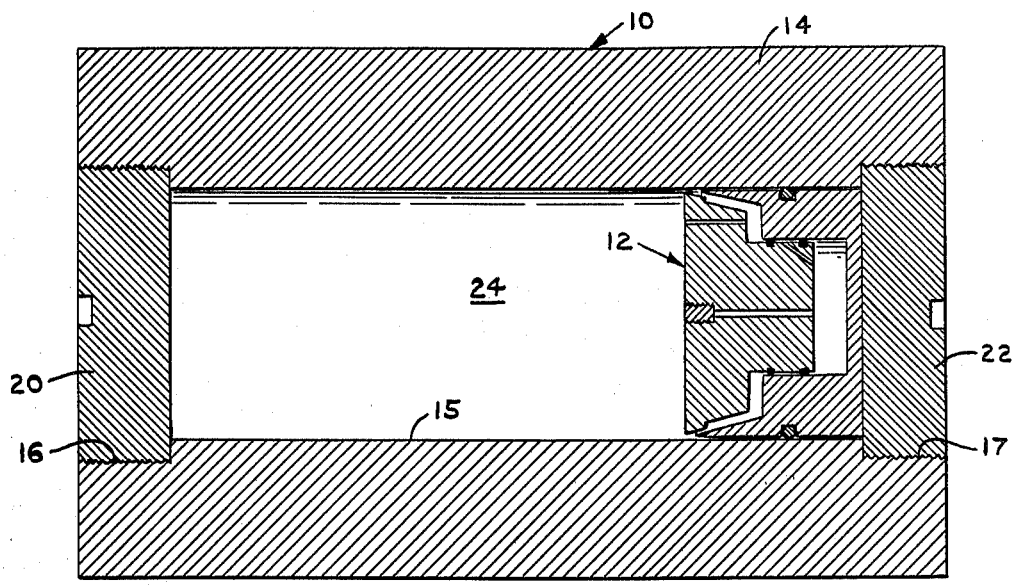
FIG. 1
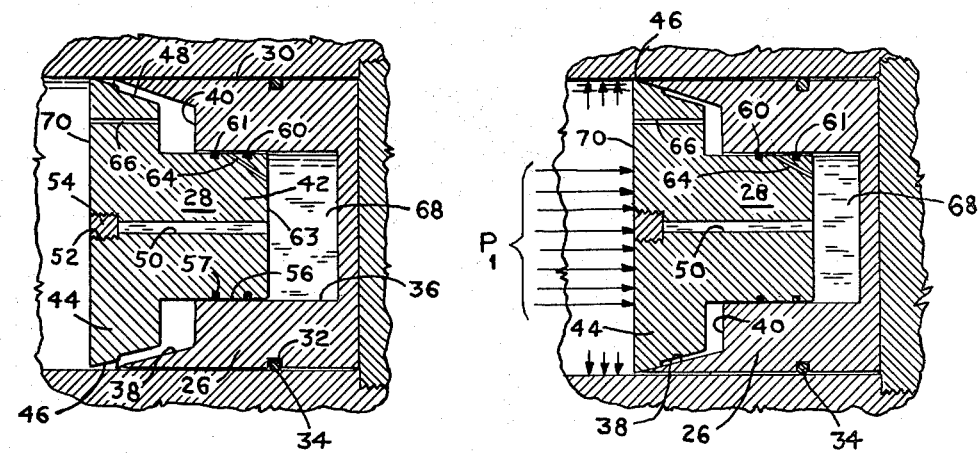
FIG. 2
FIG. 3
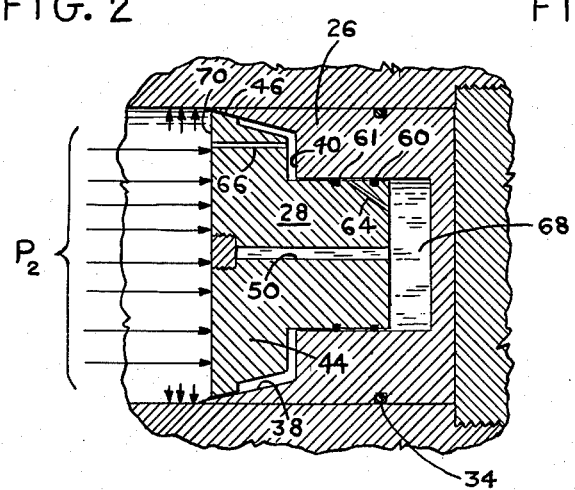
FIG. 4

HIGH PRESSURE LIP SEAL

GOVERNMENTAL INTEREST

The invention described herein may be manufactured, used and licensed by or for the Government for Governmental purposes without the payment to me of any royalties thereon.

BACKGROUND OF THE INVENTION

This invention relates to seals for retaining pressurized fluids within containers. More specifically, this invention relates to seals for retaining pressurized fluids within containers, the pressures on the fluid to be contained being of such a magnitude as to require both primary sealing for low pressure sealing and secondary sealing for high pressure sealing.

For as long as man has concerned himself with attempting to contain fluids in multi-piece containers he has been faced with the problem of sealing the interfaces between the container components against leakage. The sealing means which have been devised range from simple gaskets to complex pressure responsive seals.

The simple sealing devices such as O-rings and other structures traditionally have been made of materials such as rubber, elastomeric materials, graphite and the like. As is well known to those having skills in this art, such materials are deformable under high pressure and otherwise lack the molecular structure to support either the shear forces or face loadings which may be experienced.

Because of the inability of non-metallic seals to effect satisfactory containment of fluids at relatively high pressures, those skilled in these arts have resorted to seals wherein the sealing is effected by a metal-to-metal surface engagement. In static sealing situations, for example, it is known to utilize straight compression washers wherein the initial tightening load provides the elastic force against the face constituting the seal. Dynamic sealing devices, i.e. sealing structures wherein sealing force is generated by multiplying the effective sealing pressures such as by utilizing unbalanced areas, have heretofore required careful design and coordination. Ordinarily such seals utilize metal-to-metal contact and operate by causing initial alignment forces to effect an elastic-sealing engagement between seal components to establish a low-pressure seal whereafter increased pressures cause elastic deformation of the seal components so as to reinforce the seal. Typical of structures which utilize such a design are plug valves, ball valves, mushroom seats and complex multiple component seals.

Such prior art structures have been found to be disadvantageous because they are self-limiting. More specifically, by incorporating the primary and secondary sealing structures into a single functioning unit, the structure must be responsive to the relatively low primary sealing pressures thus inherently limiting the pressure handling ability of the structure in the secondary or high pressure sealing phase. In this regard, the nature of the difficulty which is experienced is that the seal structure undergoes plastic rather than elastic deformation thereby destroying the seal.

SUMMARY OF THE INVENTION

It is an object of the present invention, therefore, to provide a sealing means for use with vessels for containing high pressure fluids which sealing means incorporate independently operated primary and secondary sealing structures.

Another object of the present invention is to provide sealing structures for high pressure fluid containing vessels wherein primary and secondary sealing functions are achieved by independent sealing means and further wherein the operating ranges of the primary and secondary sealing structures overlap.

Yet an additional object of the present invention is to provide for sealing structures for high pressure fluid containing vessels wherein the seal design is self-intensifying i.e. the greater the pressure the greater the sealing force.

Still an additional object of the present invention is to provide a sealing structure for high pressure fluid containing vessels wherein a primary sealing means and a secondary sealing means are incorporated in independently operating sealing structure.

These objects and others not enumerated are achieved by the sealing structure of the present invention, one embodiment of which may include an end closure for cooperating with a pressure vessel to define a cavity, seal carrier means slidably disposed within the cavity adjacent the enclosure, the seal carrier defining means for isolating the enclosure from pressures developed within the cavity and wherein the seal carrier incorporates a seal body having a bore formed therein, a primary sealing means disposed between the sealed body and the wall of the cavity, a seal piston reciprocably received within the bore of the sealed body, the sealed piston including a tapered surface for engaging the surface of the seal body bore in response to displacement of the sealed piston inwardly of the bore and further for displacing at least a portion of the sealed body outwardly into surface-to-surface contact with the wall of the cavity in response to generation of pressures whereby to establish a sealing relationship between the sealed body and the wall of the cavity such as to preclude passage of fluid therebetween into the space defined by the outer surface of the sealed body and the inner surface of the cavity.

BRIEF DESCRIPTION OF THE DRAWINGS

A more complete understanding of the present invention may be had from the following detailed description thereof, particularly when read in the light of the accompanying drawings, wherein:

FIG. 1 is a cross-sectional elevational view, partly schematic, of a high pressure bomb calorimeter incorporating sealing structure in accordance with the teaching of the present invention;

FIG. 2 is a cross-sectional elevational view of a portion of the calorimeter of FIG. 1 showing the structure of the high pressure seal according to the present invention in detail;

FIG. 3 is a cross-sectional elevational view similar to the view of FIG. 2 but showing the structural relationships of the components when subjected to initial or primary fluid pressures; and FIG. 4 is a cross-sectional elevational view similar to the views of FIGS. 2 and 3 and showing the structural relationships of the elements when subjected to extremely high or secondary fluid pressures.

DETAILED DESCRIPTION

As noted above, this invention relates to seals for retaining pressurized fluids within containers. Accordingly, referring to FIG. 1, there is shown a high pressure fluid container, in this case a bomb calorimeter designated generally by the reference numeral 10 in which is incorporated a high pressure fluid seal structured in accordance with the teaching of the present invention and designated generally by the reference numeral 12.

High pressure fluid container 10 includes a cylindrical vessel 14 having a bore 15 extending axially therethrough. Formed in one end of bore 15 is a first threaded counterbore 16. Formed in the opposite end of bore 15 from first threaded counterbore 16 is a second threaded counterbore 17. Counterbores 16 and 17 are coaxial with bore 15 and extend partially into the length thereof.

Threadedly received within first threaded counterbore 16 is a first plug 20 which defines a first end closure for bore 15. Threadedly received within second threaded counterbore 17 is a second plug 22 which defines a second end closure for bore 15. The inner surface of bore 15 cooperates with the inner surfaces of first plug 20 and second plug 22 to define a fluid cavity 24. As will be recognized by those skilled in these arts, however, the threaded cooperation of plugs 20 and 22 with threaded counterbores 16 and 17 respectively, while defining end closures, do not provide fluid tight sealing such as to permit the generation of extremely high pressures within cavity 24. Accordingly, there is a necessity for sealing means to preclude the passage of fluid from cavity 24 out of the vessel. In view of the fact that fluid container is a high pressure fluid container, in this particular embodiment a bomb calorimeter, the sealing means 12 must be capable of withstanding extremely high pressures i.e. the pressures of detonated explosives or other expanding gases. It will be further recognized by those skilled in these arts that a bomb calorimeter such as container 10 will be provided with radially extending bores through the walls of cylindrical vessel 14 to accommodate igniter means, instrumentation, filling means and the like. In view of the fact that such structures do not constitute any part of the present inventive concept, they are not shown. However, it should be recognized that in the operation of the high pressure container as a bomb calorimeter such structures and components would be provided in accordance with technology readily available in these arts.

Considering, therefore, the specific structure of high pressure fluid seal 12 and with particular reference to FIGS. 2, 3 and 4, seal 12 can be seen to comprise a seal body 26 and a seal piston 28.

Seal body 26 is a generally cylindrical cup-shaped member having an outer surface 30 which is sized to be slidably received within bore 15 of high pressure fluid container 10. Formed in the outer surface 30 of seal body 26 is an annular channel 32 in which is mounted an O-ring seal 34, which seal defines the primary sealing element of seal structure 12 all as discussed below in detail.

The cup shape of seal body 26 is effected by the provision of a bore 36 which extends axially through almost the entire length of seal body 26. There is provided in the open end of seal body 26 a tapered counterbore 38 which extends partially through the axial length of seal body 26 and which cooperates with bore 36 to define a radially extending shoulder 40.

Reciprocably disposed within seal body 26 is seal piston 28. More specifically, seal piston 28 comprises a generally cylindrical portion 42, the outer surface of which is substantially equal in diameter to the diameter of bore 36 of seal body 26 so as to permit reciprocable sliding movement therebetween. Formed on one end of cylindrical portion 42 is a generally radially extending annular shoulder 44. The outer surface of radially outwardly extending annular shoulder 44 is relieved to define a stepped tapered surface. Stepped tapered surface includes an outer surface 46 and an inner portion 48. For reasons discussed below in detail, the angle of taper of outer tapered portion 46 is inclined at an angle which is substantially equal to the angle of taper of tapered counterbore 38 of seal body 26.

Extending axially throughout the axial length of seal piston 28 is a throughbore 50. The end of throughbore 50 proximal to annular shoulder 40 is provided with a tapped counterbore 52 which is adapted to receive therein a threaded plug 54 which is provided to preclude the passage of fluid through throughbore 50.

Formed in the external surface of cylindrical portion 42 of seal piston 28 are first and second annular channels 56 and 57 respectively. First annular channel 56 is adapted to define a housing for first internal O-ring seal 60. Similarly, second annular channel 57 is adapted to define structure for containing a second internal O-ring seal 61.

Provided to extend generally radially angularly from the end surface 63 of cylindrical portion 42 to the outer cylindrical surface thereof between annular channels 56 and 57 is an O-ring vent passage 64, the function of which is discussed below in detail.

Similarly, there is provided through annular shoulder 44 a generally longitudinally extending balancing passage 66.

As is discussed below in detail, seal piston 28 moves reciprocably within seal body 26 during the sealing operation of seal 12 such as to establish a primary sealing for relatively low fluid pressures and thereafter an independent secondary sealing for sealing against the escape of extremely high pressure fluids.

Considering, therefore, the operation of high pressure seal 12 and with particular reference to FIGS. 2, 3 and 4, it will be noted initially that end surface 63 of seal piston 28 cooperates with the base of seal body 26 and the inner surface of bore 36 to define a liquid receiving cavity 68. In order to operate seal 12, plug 54 is removed from threaded counterbore 52 and fluid is introduced into fluid cavity 68 through bore 50. When the cavity and bore and completely filled, plug 54 is reinserted in threaded counterbore 52 such as to retain the fluid therein. In this regard, it should be noted that passage of fluid out of fluid cavity 68 around the external surface of cylindrical portion 42 of seal piston 28 is precluded by the cooperative effect of O-ring seals 60 and 61 and vent passage 64. Thus, a "slave" O-ring 61 is installed at the gas end and an annular liquid column is interposed between the two O-rings 60 and 61 via vent passage 64 to insure that the O-ring 60 at the liquid end is always in contact with a clean bore surface. The purpose of the vent passage 64 is to equalize the pressure across each of the O-rings (since the pressure at the gas end is equal to the pressure in liquid reservoir and annular liquid column between the O-rings) and thereby avoid shear failure of the elastometric O-rings.

The position of seal 28 within seal body 26 as shown in FIG. 2 represents the unpressurized position of the parts i.e. the nascent condition, after installation and charging and immediately before the generation of high pressure within cavity 24.

Seal piston 28 is maintained in this position with respect to seal body 26 by the operation of fluid within cavity 68.

Upon the occurrence of a generation of pressure within cavity 24, e.g. by reason of ignition of explosive materials or the like, a pressure $P_1$ (FIG. 3) is generated against the outer surface 70 of seal piston 28. The generation of fluid pressure within cavity 24 causes a corresponding generation of pressure along the outer surface of seal body 26 up to the position of O-ring seal 34 which is provided with annular channel 32. Thus, O-ring 34 defines the primary pressure, i.e. low pressure sealing means for precluding passage of fluid out of cavity 24 toward first and second plugs 20 and 22.

Continuous build-up of pressure $P_1$ across the face 70 of seal piston 28 causes an axial movement of seal piston 28 inwardly of seal body 26 until tapered surface 46 of seal piston 28 comes into surface-to-surface engagement with tapered counterbore 38 of seal body 26. In this regard, vent passage 66 serves to preclude the trapping of fluid between annular shoulder 44 of seal piston 28 and the counterbore 38 and radially extending shoulder 40 of seal body 26.

As seal piston 28 is displaced inwardly of seal body 26, the liquid in cavity 68 is pressurized by reason of the fact that it is a contained liquid. As pressure develops within the liquid its volume is reduced in accordance with the properties associated with its "bulk modulous", i.e. the liquid becomes compressible at high pressure.

As the pressure within cavity 24 continues to be developed into extremely high pressure, seal piston 28 is displaced still further into seal body 26 such as to cause a radially outward deformation of the thin end of seal body 26 adjacent the end of tapered counterbore 38. Such radially outward displacement of the material of seal body 26 continues until a surface-to-surface contact is established between the outer surface of seal body 26 and the surface of bore 15 of high pressure fluid container 10. With such a surface-to-surface contact established, the sealing function of the structure transfers from primary elastometric seal 34 to the deflected material of seal body 26 and, as will be recognized by those skilled in these arts, continued increases in pressure result in continued increases in sealing forces thereby precluding the passage of fluid out of chamber 24.

The transfer of the sealing function from primary seal 34 to the metal-to-metal surface-to-surface sealing effect between seal body 26 and bore 15 will be recognized to effect an isolation of primary seal 34 thereby precluding the failure of the seal through plastic deformation as might otherwise be the case and has often been experienced in prior art structures.

After the achievement of primary and thereafter secondary sealing, pressure will continue to be exerted across surface 70 of seal piston 28 until the liquid in chamber 68 has achieved its equilibrium volume. The pressure differential across the seal piston head, i.e. across annular shoulder 44 thereafter relatively slowly becomes zero by reason of the venting action of fluid through balancing passage 66.

As the generation of high pressure is completed and pressure is vented from the cavity 24 through some venting source not shown, a pressure differential across annular shoulder 44 is established which tends to withdraw seal piston 28 from seal body 26 thereby permitting disestablishment of the secondary seal and reliance thereafter on the primary seal for preclusion of fluid escape from cavity 24.

Thus, it can be seen that the present invention provides a seal which establishes low pressure and thereafter high pressure sealing in sequential operations which are independent one from the other.

The seal construction is economical to manufacture, simple to maintain and highly effective.

Of course it will be recognized by those skilled in these arts that the drawings of seal structure made reference to by way of detailed description are exaggerated in order to facilitate an understanding by the reader. Thus, it should be noted that a sealing structure according to the invention has been constructed and utilized in conjunction with a bomb calorimeter wherein the outer diameter of seal body 26 is dimensioned to provide a one-thousandth inch clearance between the outer surface of seal body 26 and the inner surface of bore 15. Further, it has been found that a fifteen degree taper for surfaces 46 and 38 is an effective taper such as to permit adequate control and adequate sealing deflection without exceeding the elastic limit of the material of the seal body.

In this regard, bomb calorimeters having a 40 mm diameter bore utilizing a steel seal body has successfully contained peaked pressures of 200,000 lbs. per square inch. This, of course, is a highly desirable result as will be recognized by those skilled in these arts.

It will be further recognized by those skilled in these arts that the foregoing detailed description of the sealing structure of the present invention has been disclosed in the context of a preferred embodiment, i.e. in use with a bomb calorimeter. Many modifications and variations of the basic proposal of this invention may be made without departing from the spirit and scope thereof.

I claim:

1. A pressure seal for sealing a vessel against passage of pressurized fluid out of a cavity formed in said vessel by the cooperation of said vessel with at least one end closure, said seal comprising;

a seal carrier means slidably disposed within said cavity adjacent said end closure, said seal carrier defining means for isolating said end closure from pressures developed within said cavity and including, a seal body having a bore formed therein, a primary sealing means disposed between said seal body and the wall of said cavity, a seal piston reciprocably received within said bore of said seal body, said seal piston including a tapered surface for engaging the surface of said bore of said seal body in response to displacement of said seal piston inwardly of said bore of said seal body and further for displacing at least a portion of said seal body outwardly into surface-to-surface contact with said wall of said cavity in response to generation of pressures within said cavity and against said seal piston, said displacement of said portion of said seal body into surface-to-surface contact with said wall of said cavity defining a secondary seal whereby to preclude passage of fluid into the space defined by the outer surface of said seal body and the inner surface of said cavity, wherein (a) said primary sealing means comprises an O-ring seal disposed in an annular channel formed in the outer surface of said seal body, said O-ring means being in surface-to-surface engagement with said seal body and with said wall of said cavity, (b) at least a portion of said bore of said seal body is tapered at an angle substantially corresponding to said tapered surface of said seal piston such that said tapered surface of said bore of said seal body engages said tapered surface of said seal piston during displacement of said seal body into said secondary sealing condition, (c) said seal piston cooperates with said bore to said seal body to define a cavity containing a liquid therein, said liquid being compressed in response to the displacement of said seal piston into said seal body, and (d) said seal piston includes a first O-ring contained in a first annular channel and a second O-ring contained in a second annular channel, said O-rings being in surface engagement with the seal piston and the bore of said seal body, and a first vent passage extending from the front end surface of said piston to the outer surface thereof between said O-rings for equalizing the fluid pressure across each of said O-rings.

2. Apparatus according to claim 1, wherein said seal piston includes a second vent passage extending from the rear end surface to an area on the outer surface thereof between said tapered surface and said O-rings for equalizing the fluid pressure across said piston.

3. Apparatus according to claim 2, wherein said seal piston includes a third passage extending axially from the rear end surface to the front end surface thereof for filling said cavity with liquid, and means for closing said passage for retaining the liquid in said cavity.

* * * * *